UNITED STATES PATENT OFFICE.

WILLIAM STEPNEY RAWSON, OF WESTMINSTER, AND ROBERT DEXTER LITTLEFIELD, OF THORNTON HEATH, ENGLAND.

PROCESS OF MANUFACTURING BRICKS, FURNACE-LININGS, CRUCIBLES, OR OTHER ARTICLES.

SPECIFICATION forming part of Letters Patent No. 683,795, dated October 1, 1901.

Application filed August 30, 1900. Serial No. 28,596. (No specimens.)

*To all whom it may concern:*

Be it known that we, WILLIAM STEPNEY RAWSON, residing at 21 Greycoat Gardens, Victoria street, Westminster, and ROBERT DEXTER LITTLEFIELD, residing at 30 Bensham Manor road, Thornton Heath, in the county of Surrey, England, citizens of England, have invented a certain new and useful Process of Manufacturing Refractory Bricks, Furnace-Linings, Crucibles, or other Articles, (for which we have applied for a patent in Great Britain, dated February 9, 1900, No. 2,613,) of which the following is a specification.

Our invention relates to the manufacture of articles capable of standing very high temperatures, such as bricks and linings for furnaces, crucibles, retorts, cupels, and the like. For this purpose we calcine and finely pulverize magnesite or magnesium oxid and intimately mix with it a small quantity of a fusible boron compound, such as boron trioxid, boracic acid, or any fusible borate. The mixture is preferably made by grinding the calcined magnesite with the boron compound, the quantity of which varies according to the composition of the magnesite. For magnesite containing a little lime about two per cent. of the boron compound may suffice; but when the magnesite contains a considerable portion of lime the proportion of boron compound may have to be as much as twelve per cent. The mixture is moistened with water just sufficient to make it into a paste capable of being molded. It is then molded into the desired form, and the molded articles are dried and afterward baked at a very high temperature. Furnace linings and bottoms may be made by ramming the mixed material in place and baking by the heat of the furnace itself.

Having thus described the nature of this invention and the best means we know for carrying the same into effect, what we claim is—

A process of manufacturing refractory articles, which consists in mixing calcined magnesite and a fusible compound of boron, both pulverized, moistening with a little water, molding and then baking at a high temperature.

In testimony whereof we have hereunto set our hands in presence of two subscribing witnesses.

W. STEPNEY RAWSON.
ROBERT DEXTER LITTLEFIELD.

Witnesses:
JOSEPH LAKE,
GERALD R. SMITH.